US008810083B2

(12) United States Patent
Kirstein

(10) Patent No.: US 8,810,083 B2
(45) Date of Patent: Aug. 19, 2014

(54) ELECTROMAGNETIC DRIVE, DRIVE INSTALLATION AND USE THEREOF

(76) Inventor: Gerhard Kirstein, Augsburg (DE)

( * ) Notice: Subject to any disclaimer, the term of this patent is extended or adjusted under 35 U.S.C. 154(b) by 169 days.

(21) Appl. No.: 13/483,152

(22) Filed: May 30, 2012

(65) Prior Publication Data

US 2012/0306295 A1 Dec. 6, 2012

(30) Foreign Application Priority Data

Jun. 1, 2011 (DE) .......................... 10 2011 103 169

(51) Int. Cl.
*H02K 33/00* (2006.01)
*H02K 33/02* (2006.01)
*H02K 33/10* (2006.01)
*H02K 33/16* (2006.01)

(52) U.S. Cl.
CPC ............... *H02K 33/02* (2013.01); *H02K 33/10* (2013.01); *H02K 33/16* (2013.01)
USPC ................................. 310/15; 310/30; 310/36

(58) Field of Classification Search
CPC ........ H02K 33/02; H02K 33/10; H02K 33/16
USPC .................... 310/15, 17–21, 30, 36
See application file for complete search history.

(56) References Cited

U.S. PATENT DOCUMENTS

| 4,480,202 | A | * | 10/1984 | Leutner et al. ............. 310/12.24 |
|---|---|---|---|---|
| 5,203,172 | A | * | 4/1993 | Simpson et al. ................ 60/545 |
| 5,341,055 | A | * | 8/1994 | Roche .............................. 310/24 |
| 5,440,183 | A | * | 8/1995 | Denne ......................... 310/12.26 |
| 7,859,144 | B1 | * | 12/2010 | Sahyoun ......................... 310/15 |
| 8,610,320 | B2 | * | 12/2013 | Kobayashi ....................... 310/30 |
| 2009/0058201 | A1 | * | 3/2009 | Brennvall ....................... 310/31 |
| 2010/0027092 | A1 | * | 2/2010 | van Os ....................... 359/223.1 |
| 2010/0277012 | A1 | * | 11/2010 | Kobayashi ....................... 310/30 |

FOREIGN PATENT DOCUMENTS

| DE | 78 23 613 | | 11/1979 |
|---|---|---|---|
| DE | 28 53 301 | A1 | 7/1980 |
| DE | 200 00 397 | U1 | 4/2000 |
| WO | WO 2011/026553 | A1 | 3/2011 |

* cited by examiner

*Primary Examiner* — Thanh Lam
(74) *Attorney, Agent, or Firm* — Ostrolenk Faber LLP

(57) ABSTRACT

The invention relates to an electromagnetic drive (11), which is connected or can be connected to an open-loop control device or closed-loop control device (54) and together with the latter can form an electromagnetic drive installation. The electromagnetic drive (11) contains a hollow-cylindrical drive coil (12), in which an armature (14) can be driven in each case from one to the other of two end stations (26, 28) or back by an electromagnetic pulse of the drive coil (12). Holding means (40, 42), preferably permanent magnets, hold the armature (14) in the end station respectively reached until the electromagnetic pulse is generated once again.

24 Claims, 4 Drawing Sheets

ELECTROMAGNETIC DRIVE, DRIVE INSTALLATION AND USE THEREOF

The invention relates to an electromagnetic drive.

Furthermore, the invention relates to an electromagnetic drive installation which contains such an electromagnetic drive.

Furthermore, the invention relates to the use of such an electromagnetic drive and to the use of such an electromagnetic drive installation for the actuation of actuators such as, for example, for the actuation of valves, actuating cylinders, relays, transistors, thyristors, electrical switches, and in particular throttle valves, in each case in particular for internal combustion engines and in each case in particular for motorcycle traction drives.

The electromagnetic drive according to the invention generates electromagnetically a linear movement of the armature. This linear movement can be transmitted in the form of a linear movement to other elements or can be converted into a rotational movement and transmitted as a rotational movement to other elements, for example by means of a pawl drive.

The prior art discloses a drive having an electric motor and a gear mechanism. The high rotational speed of the electric motor is converted into a lower rotational speed by the gear mechanism. In order to generate movements in alternately opposite directions of movement, for alternating reversal of the direction of rotation of the electric motor, a complex electrical circuit having many components is necessary, for example a circuit having four power drivers. Further, the drive consisting of electric motor and gear mechanism is expensive to produce. It has a high weight. Furthermore, it is large and requires a large incorporation space in the relevant installation in which it is used.

The invention is intended to solve the problem of providing a novel, particularly advantageous electromagnetic drive. The latter is intended to be able to be operated with a simpler electrical circuit than known installations. Disadvantages present in the prior art are intended to be reduced.

This problem is solved according to the invention by means of an electromagnetic linear drive and an electromagnetic drive installation according to the patent claims.

Accordingly, the invention relates in accordance with a first embodiment to an electromagnetic drive, containing a hollow-cylindrical drive coil; an armature containing iron or consisting of iron in the form of a piston, which is arranged in an axially movable manner in the coil cavity axially with respect to the coil center axis along a rectilinear movement path; wherein axial end stops define axial end stations of the armature; characterized in that the drive coil is designed for generating a respective electromagnetic drive pulse which acts on the armature in the coil cavity and the length of which is shorter than the axial movement duration of the armature which is required by the armature with its axial iron center optionally in each case either from one end station or from the other end station until reaching the axial center of the movement path, wherein the electromagnetic force of the drive pulse is strong enough to drive the armature in each case from one end station or from the other end station through the axial center of the movement path right into the relevant other end station; wherein measures or holding means are provided in such a way that they hold the armature in the end station respectively reached in each case until the armature is driven again, by an electromagnetic drive pulse of the drive coil acting on it once again, from the end station reached through the axial center of the movement path right into the relevant other end station.

One particularly advantageous second embodiment of an electromagnetic drive according to the invention is characterized in that at least in the case of one of the two end stations, preferably in the case of each of the two end stations, said holding means have at least one holding magnet arranged in such a way that its holding magnet force acts on the armature in the relevant end station and thereby holds it in said end station as long as a renewed electromagnetic drive pulse from the drive coil does not act on it; wherein the drive pulse is preferably stronger than the holding magnet force and can thereby overcome the latter.

One particular advantageous third embodiment of the invention is characterized in that the holding magnets have at least one permanent magnet, preferably a ring magnet, which generates the holding magnet force.

An alternative fourth embodiment of the invention is characterized in that the holding magnets have at least one electromagnetic holding coil for generating the holding magnet force.

In order to obtain an increased operational reliability, in an advantageous manner in accordance with a fifth embodiment of the invention, for at least for one of the two end stations, sensor can be provided for identifying whether the armature is situated in said end station. The sensor can interact with the armature or with a detectable element provided on the armature or on an element connected to the latter for common movement. The sensor can be a mechanical type or can be an inductive or capacitive type. The sensor can have, for example, a Hall generator or a reed contact.

A likewise special sixth embodiment of the invention is characterized in that, in the case of at least one of the two end stations, preferably in the case of each of the two end stations, in a manner axially offset with respect to the center of the movement path, a coil is provided as an identifying coil for inductively identifying whether the armature is situated in said end station. Alternatively, this identification can be performed capacitively.

In order that the electromagnetic drive can be made functional again if the armature sticks in an undesirable manner in an intermediate station between the two end stations, in accordance with a special seventh embodiment of the invention, at least one electromagnetic coil can be provided as a reset coil in such a way that it can generate an electromagnetic reset pulse which can act on the armature and thereby drive it back from a position stuck between the end stations into one of said end stations.

A special eighth embodiment of the invention is characterized in that, in the case of at least one of the two end stations, preferably in the case of each of the two end stations, in a manner axially offset with respect to the axial center of the movement path, at least one additional coil is provided in such a way that alternatively either it can generate an electromagnetic identifying field for inductively identifying whether the armature is situated in said end station, or it can generate an electromagnetic reset pulse which can act on the armature and thereby drive it back from a position stuck between the end stations into one of said end stations. The use of the additional coil for two different functions results in a particularly simple embodiment of the electromagnetic drive and also a simple embodiment of a device controlling it by open-loop or closed-loop control.

In accordance with a ninth embodiment of the invention, the electromagnetic drive is preferably designed as an apparatus unit. As a result, it is handleable in a particularly simple manner, in particular mountable in an installation in a simple manner.

Furthermore, the invention relates to advantageously designed electromagnetic drive installations.

In accordance with a tenth embodiment of the invention, such a drive installation is characterized by an electromagnetic drive according to one of the claims and by an open-loop or closed-loop control device, which is connected or can be connected to the drive coil and is designed for generating electrical pulses and outputting said electrical pulses to the drive coil in such a way that the electrical pulses generate in the drive coil the electromagnetic drive pulses.

A special eleventh embodiment of an electromagnetic drive installation according to the invention is characterized in that the open-loop or closed-loop control device is connected or can be connected to the identifying coil from claim 6 and is designed for generating and outputting an electrical voltage, preferably electrical voltage pulses, to the identifying coil in such a way that the open-loop or closed-loop control device inductively detects whether the armature is situated in the relevant end station.

A special twelfth embodiment of the electromagnetic drive installation according to the invention is characterized in that the open-loop or closed-loop control device is connected or can be connected to the reset coil from claim 7 and is designed for generating and outputting electrical reset pulses which can act on the armature and thereby drive it back from a position stuck between the end stations into one of said end stations.

In accordance with a particularly advantageous thirteenth embodiment of the invention, the electromagnetic drive installation is characterized in that the open-loop or closed-loop control device is connected or can be connected to the additional coil from claim 8 and is designed for alternatively generating an electrical voltage for inductively identifying the armature in at least one of the two end stations or for generating electrical reset pulses, wherein said electrical reset pulses can respectively generate the electromagnetic reset pulse which can act on the armature and thereby drive it back from a position stuck between the end stations into one of said end stations.

The end stops for limiting the armature and/or the armature at its stop locations that make contact with the end stops are/is preferably provided with an impact damping material that damps the impact strength, for example silicone or rubber.

The holding means for holding the armature in the respectively predetermined end position can contain, instead of or in preference to a permanent magnet, an electromagnet and/or mechanical means, for example a spring and/or spring-elastically compressible and thereby clampable material, for example rubber or plastic.

Spring means can also be used to force the armature in the direction of one or the other end station.

The electromagnetic drive can also have an additional element consisting of iron, e.g. a yoke or a housing consisting of iron, in order thereby to improve the electromagnetic properties.

In accordance with one special embodiment of the invention, the armature can also be held by gravitational force in one or the other end station for example by virtue of the drive coil being arranged with its center axis vertically, such that the armature is pulled downward to the lower end station by gravitational force.

The electromagnetic drive force of the electromagnetic drive pulse is strong enough that it can overcome the for example magnetic holding force in the end stations. In accordance with special embodiments, the holding force can be designed such that it can be turned off.

The invention also relates to a motor vehicle, in particular a motorcycle, which has an internal combustion engine and is provided with at least one electromagnetic drive and/or an electromagnetic drive installation according to the present description and the patent claims.

The invention is described below on the basis of preferred embodiments with reference to the drawings, in which.

Figure 11:
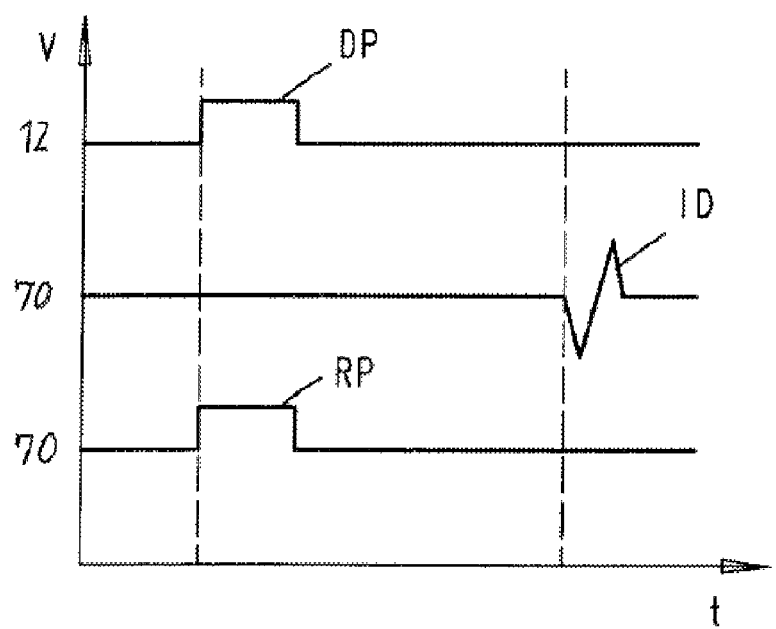

FIG. 11 shows in a diagram an electromagnetic drive pulse that can be generated by means of the drive coil and serves for electromagnetically driving the armature from one end station to the other end station or in the opposite direction from the other end station to said one end station; a measurement signal that can be generated at the respective other end station by means of an additional coil only when the armature actually reaches the relevant other end station; and an electromagnetic reset pulse that can be generated by means of the same additional coil and can be generated for resetting the armature into one of the end stations, e.g. on request or preferably automatically if said measurement signal fails to appear after the generation of the drive pulse.

Figure 1:
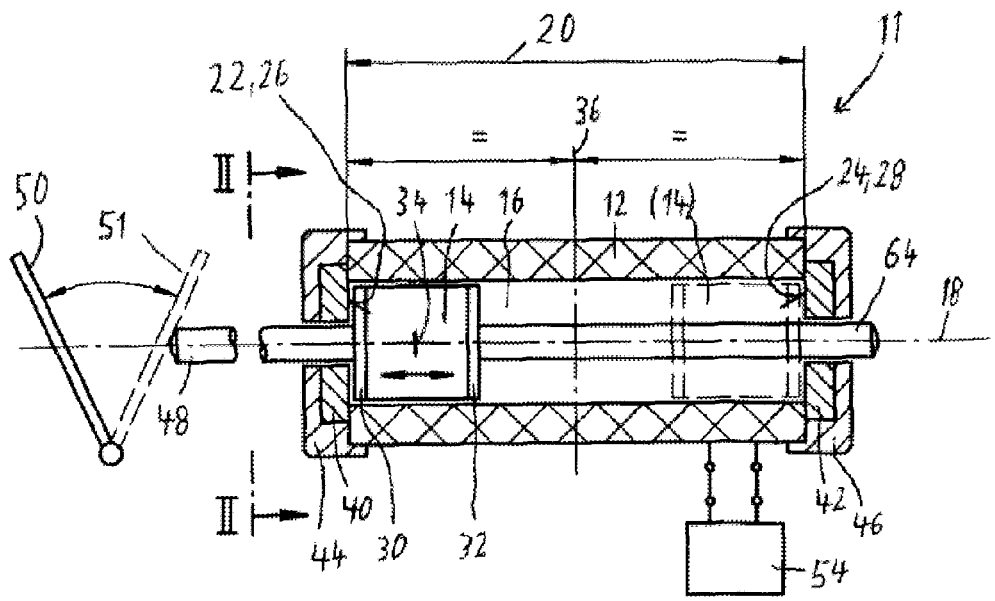
FIG. 1 shows an axial longitudinal section through an electromagnetic drive according to the invention, which is connected or can be connected to an open-loop control device or closed-loop control device and together with the latter forms an electromagnetic drive installation.

The electromagnetic drive 11 from FIG. 1 contains a hollow-cylindrical drive coil 12 and an armature 14, containing iron or consisting of iron. The armature 14 has the form of a piston, which is arranged in an axially movable manner in the coil cavity 16 axially with respect to the coil center axis 18 along a rectilinear movement path 20. End stops 22 and 24 directed axially toward one another are provided at both ends of the movement path 20 and axially delimit the movement path 20 and thereby define axial end stations 26 and 28, respectively, of the armature 14 on the movement path 20. The armature 14 is situated in one of said end stations 26 and 28 in each case when it bears against the relevant end stop 22 and 24, respectively, of said end stations.

The end stops 22 and 24 can be formed by special stop elements or by stop surfaces of an element that also performs other functions, e.g. preferably by the permanent magnets described here later.

For impact damping and for noise damping of the armature 14 striking the end stops 22 and 24, one and/or the other of the elements striking one another can be provided with a damping element, for example with a spring element or with a spring-elastically combinable damping material, for example silicone or rubber. Such a compressible spring-elastic damping material can be provided, for example, at the end stops 22 and 24 and/or at the end faces of the armature 14. In the embodiments of the invention which are described here, as an example the armature 14 is provided with a spring-elastically axially compressible damping element 30 and 32 respectively on its axial end faces. One damping element 30 lies axially opposite one end stop 22 and can strike the latter. The other damping element 32 lies axially opposite the other end stop 24 and can strike the latter.

The drive coil 12 is designed for generating a respective electromagnetic drive pulse which acts on the armature 14 in the coil cavity 16 and the length of which is shorter than the axial movement duration of the armature 14 which is required by the armature 14 with its axial iron center 34 optionally in each case either from one end station or 28 or from the other end station 26 or 28 until reaching the axial center 36 of the movement path 20, wherein the electromagnetic force of the drive pulse is strong enough to drive the armature 14 in each case from one end station 26 or 28 or from the other end station 26 or 28 through the axial center 36 of the movement path 20 right into the relevant respective other end station. For the generation of the two mutually opposite movements of the armature 14, a different electromagnetic drive pulse or preferably an identical electromagnetic drive pulse can be used for each direction of movement.

Holding means 40 and 42 hold the armature 14 in the end station 26 or 28 respectively reached in each case until the armature 14 is driven, by an electromagnetic drive pulse of the drive coil 12 acting on it once again, from the end station 26 or 28 reached through the axial center 36 of the movement path 20 right into the relevant other end station 26 or 28.

If, instead of such a drive pulse that is temporally short but defined in terms of its strength, an electromagnetic field of the drive coil 12 acting over a longer time were generated, then the armature 14 would be held by this electromagnetic field on the movement path 20 in an intermediate station lying in the axial center 36 of the movement path 20.

The holding means 40 and 42 preferably in each case consist of a permanent magnet at both end stations 26 and 28. Said permanent magnet is preferably embodied in each case as a ring magnet coaxially surrounding the coil center axis 18. The holding magnet force of the relevant permanent magnet 40 or 42 holds the armature 14 in the relevant end station 26 or 28, respectively, in each case until an electromagnetic drive pulse is once again generated by the drive coil 12, which drive pulse overcomes the holding magnet force of the permanent magnet 40 or 42 in the relevant end station and thereby drives the armature from the relevant end station through the axial center 36 of the movement path 20 right into the relevant other end station.

Instead of one or the other permanent magnet 40 and or in addition it is also possible to use an electromagnet. The electromagnetic field of these electromagnets serving as holding magnets can preferably be capable of being turned off during the generation of said electromagnetic drive pulse, such that the electromagnetic drive pulse does not need to overcome the electromagnetic field strength of said electromagnets 40 and 42.

The electromagnetic drive 11 can be provided with end caps 44 and 46, respectively, or a housing. These are preferably composed of plastic. However, elements containing iron can also be used, e.g. a yoke or a housing composed of iron, in order to influence the electromagnetic fields.

A piston rod 48 can be provided, which is arranged axially with respect to the coil center axis 18 and is connected to the armature 14 for common axial movement. The piston rod 48 can be a part of a mechanical transmission device for transmitting the movements of the armature 14 to another device, for example to an actuating element 50. The actuating element 50 can be of any known type, e.g. a throttle valve in the exhaust system of an internal combustion engine. The throttle valve 50 is movable by the armature 14 in each case from the open position, depicted using solid lines in FIG. 1, into a closed position, shown using dashed lines 51, and then in the opposite direction again.

The electromagnetic drive 11 of the invention, either with or without the piston rod 48, is preferably designed as an apparatus unit. This apparatus unit can be incorporated as a component into another device or installation.

An electronic operating device 54, which is designed as an open-loop control device or as a closed-loop control device, is connected or can be connected electrically to the drive coil 12 and is designed for generating electrical pulses and for outputting said electrical pulses to the drive coil 12 in such a way that the electrical pulses generate in the drive coil 12 the electromagnetic drive pulses mentioned.

The electronic operating device 54 can be designed as an apparatus unit or be part of another device, for example of the electrical operating installation of a motorcycle. In accordance with another embodiment, the electromagnetic drive 11 and the operating device 54 can together form an apparatus unit.

Figure 2:
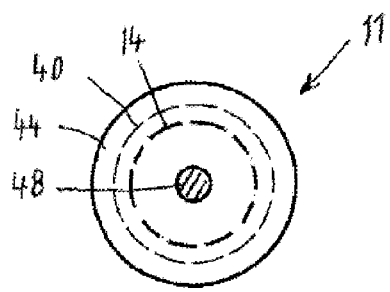
FIG. 2 is an axial end view of the electromagnetic drive along the plane II-II from FIG. 1.

All elements, functions, variants and combination possibilities described with reference to FIGS. 1 and 2 also apply to all other embodiments of the invention.

In accordance with preferred embodiments of the invention, the end stops 22 and 24 are formed by end surface sections of the permanent magnet rings 40 and 42 that lie axially opposite one another.

Figure 3:
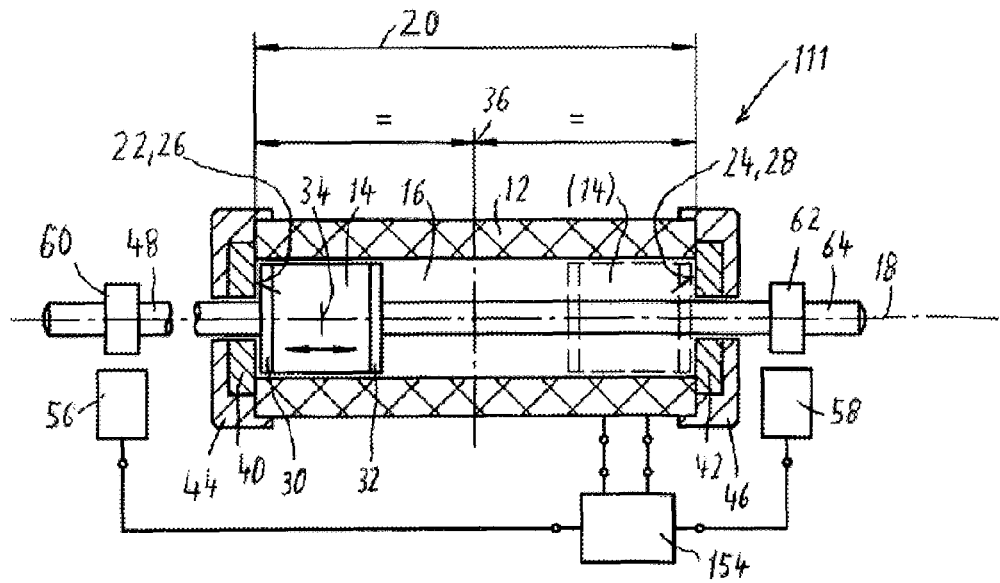
FIG. 3 shows, in a longitudinal section illustrated in a manner corresponding to FIG. 1, a further embodiment according to the invention.

In the case of the further embodiment according to the invention as shown in FIG. 3, the electromagnetic drive 111 corresponds to the electromagnetic drive 11 from FIG. 1, and an operating device 154 corresponds to the operating device 54 from FIG. 1. Elements that correspond to one another are in each case provided with identical reference numerals. The description of FIGS. 1 and 2 in this respect also applies to the description of FIG. 3.

Preferably, at least one sensor is provided for identifying whether the armature 14 is situated in one or the other of the two end stations 26 or 28. The sensor need not be arranged at the relevant end station, but rather can also be arranged at a distance therefrom. The sensor can be of mechanical, capacitive and/or inductive type.

In accordance with the embodiment from FIG. 3, a respective sensor 56 and 58 is provided for each of the two end stations 26 and 28. These sensors are in each case designed for capacitive or preferably for inductive interaction with a detection element 60 and 62, respectively. The sensors 56 and 58 can be connected or are connected to the operating device 54, which is designed for generating an indication signal in a manner dependent on signals of the sensors 56 and 58, for indicating whether the armature 14 is situated in one or the other of the two end stations 26 and 28. The sensors 56 and 58 can have Hall generators or reed contacts, for example, for functional interaction with a respective one of the two detection elements 60 and 62. The detection elements 60 and 62 are connected to the armature 14 for common axial movement. By way of example, one and/or the other detection element 60 and/or 62 can be provided on the piston rod 48 or on a guide rod 64, which is arranged on that side of the armature 14 which axially faces away from the piston rod 48, axially with respect to the coil center axis 18, and is connected to the armature 14 for common axial movement.

Figure 4:
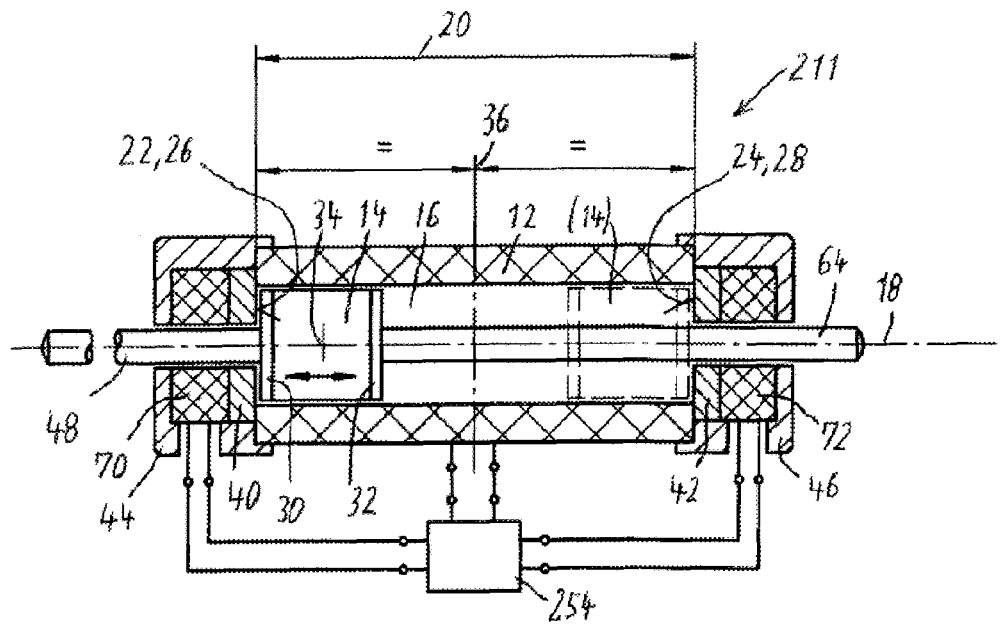
FIG. 4 shows, in a manner corresponding to the axial section from FIG. 1, yet another embodiment according to the invention.

In the case of the embodiment according to the invention from FIG. 4, the electromagnetic drive 211 are designed identically to the electromagnetic drive 11 from FIG. 1 and the operating device 254, with regard to its elements and functions, is designed identically to the Operating device 54 from FIG. 1. Therefore, any elements and functions which are additionally present in FIG. 4 are described hereinafter.

In FIG. 4, in the case of at least one, preferably in the case of both end stations 26 and 28, a respective additional coil 70 and 72 is arranged in a manner axially offset with respect to the center 36 of the movement path 20 coaxially with respect to the coil center axis 18, and thus also coaxially with respect to the center axis of the armature 14, in such a way that it can generate an electromagnetic field which permeates the armature 14 respectively in one and in the other of the two end stations 26 and 28, respectively, but not or only more weakly in the center 36 of the movement path 20. The additional coils 70 and 72 can be connected or are connected electrically to the operating device 254, and are designed for generating signals which are dependent on the axial position in which the armature 14 is respectively situated.

In accordance with FIG. 4, the additional coils 70 and 72 can be arranged in such a way that the permanent magnets 40 and 42 are situated axially between in each case the drive coil 12 and one of the two additional coils 70 and 72, respectively.

In accordance with a special first embodiment of the invention in accordance with FIG. 4, the additional coils and 72 and the operating device 254 are designed for identifying whether the armature 14 is situated in one or the other of the two end stations 26 and 28 or in neither of said end stations.

In accordance with a special second embodiment of the invention in accordance with FIG. 4, at least one of the two, preferably both, additional coils 70 and 72 and the operating device 254 are designed in such a way that the additional coils 70 and 72 act as reset coils which, in a manner dependent on a respective electrical pulse of the operating device 254, can generate an electromagnetic reset pulse which can act on the armature 14 and thereby drive it back from a position stuck between the end stations 26 and 28 into one of said end stations.

In accordance with a special third embodiment in accordance with FIG. 4, the additional coils 70 and 72 and the operating device 254 are designed in such a way that they can alternatively generate an electromagnetic identifying field for inductively identifying the armature 14 in the end stations 26 and 28 or an electromagnetic reset pulse for resetting the armature 14 from an intermediate position stuck between the end stations 26, 28 to one or the other of the two end stations 26, 28.

Figure 5:
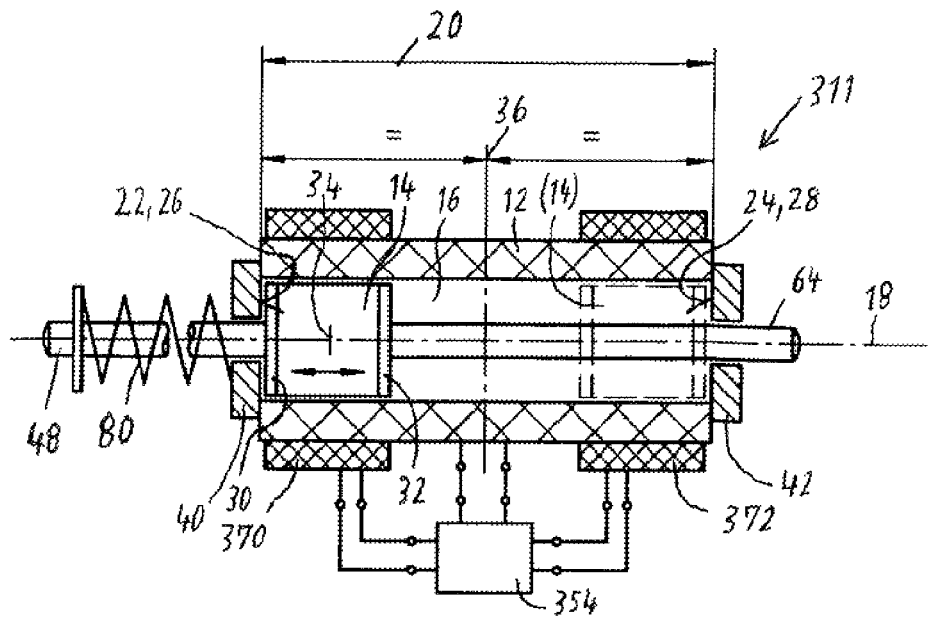
FIG. 5 shows, in a manner corresponding to the axial section from FIG. 1, in turn a further embodiment according to the invention.
Figure 6:
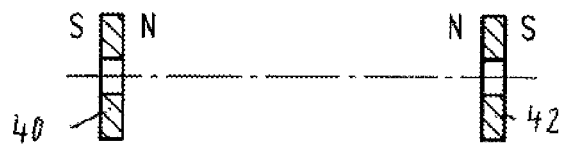
FIGS. 6, 7, 8 and 9 show axial sections of permanent magnets of the embodiment according to FIGS. 1 to 5 in the various possible pairing combinations of north pole and south pole.
Figure 7:
Figure 8:
Figure 9:
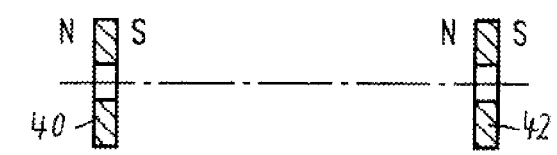

In the case of the further embodiment according to the invention as shown in FIG. 5, an electromagnetic drive 311 and an operating device 354 can in each case have all elements and all functions of the drive 11 and of the operating device 54 of the embodiments from FIGS. 1 to 4. Parts identical to those in the other figures are provided with the same reference numerals and have the same functions as in the figures described above. In accordance with FIG. 5, in the case of at least one, preferably in the case of both end stations 26, 28, a respective additional coil 370 and 372 is arranged in a manner axially offset with respect to the center 36 of the movement path 20. The additional coils 370 and 372 can be arranged on the drive coil 12 coaxially in the region of or directly adjacent to the end stations 26 and 28, respectively, in such a way that they can interact with the armature 14 electromagnetically.

In the case of the embodiment according to FIG. 5, with regard to the additional coils 370 and 372 which can be connected or are connected to the operating device 254, the same various first, second and third embodiments as have been described with reference to FIG. 4 can once again be implemented. Accordingly, in a first embodiment from FIG. 5, the additional coils 370 and 372 and the operating device 354 can in each case be designed for inductively identifying whether the armature 14 is situated in one of the end stations 26 and 28. In accordance with a second embodiment from FIG. 5, the additional coils 370 and 372 can be designed as reset coils which can generate an electromagnetic reset pulse which acts on the armature 14 and can thereby drive it back in each case from a position stuck between the end stations 26 and 28 into the relevant end station, for which purpose the operating device 354 is designed for generating an electrical pulse to the reset coil, such that the reset coil can generate the electromagnetic reset pulse in a manner dependent on the electrical reset pulse. According to a third embodiment from FIG. 5, the two additional coils 370 and 372 and the electronic operating device 354 can be designed in such a way that they can alternatively generate said electromagnetic reset pulse and thereby drive the armature 14 back in each case from a stuck intermediate position to one of the end stations 26 and 28, or can alternatively generate an electromagnetic identifying field for inductively identifying whether or not the armature 14 is situated in one of the two end stations 26 or 28.

Furthermore, FIG. 5 shows one of many possibilities of how the armature 14 can be prestressed spring-elastically by a spring 80 in at least one axial direction. According to the invention, the spring 80 can be used in addition to and/or instead of one of the abovementioned permanent magnets or one of the abovementioned electromagnets for driving the armature 14 and/or for temporarily holding the armature 14 in at least one of the end stations 26 and 28.

In all embodiments of the invention, the north poles "N" and the south poles "S" of the two permanent magnets 40 and 42 can be paired in any desired fashion, as shown by FIGS. 6, 7, 8 and 9. Accordingly, the two permanent magnets and 42 can be arranged in a mutually attracting or repelling manner. This means that the north poles or the south poles can lie opposite one another or a north pole can lie opposite a south pole.

Figure 10:
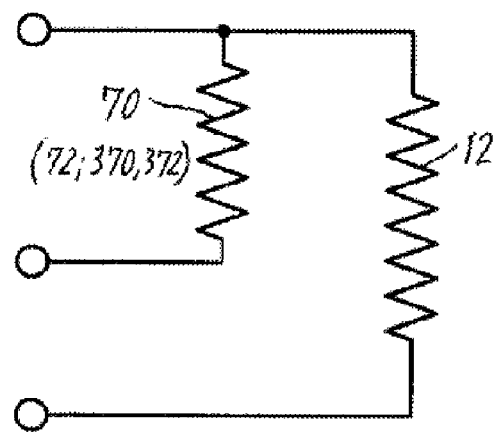
FIG. 10 shows the circuit diagram of a drive coil of the embodiment according to FIGS. 1 to 5 in combination with an additional coil in accordance with the embodiment from FIG. 4 or the embodiment from FIG. 5.

FIG. 10 schematically shows the drive coil 12 and one of the additional coils 70, 72, 370 or 372 of the embodiments according to FIGS. 4 and 5, wherein the additional coil is designated by 70 as representative of the other additional coils.

FIG. 11 shows a diagram having a horizontal time axis "t" and a vertical voltage axis "V". In FIG. 11, the topmost curve is designated by the reference numeral 12 because the drive coil 12 generates the electromagnetic drive pulse "DP". The middle curve is designated by the reference numeral 70 because the additional coil 70 (representative also of the additional coils 72, 370 and 372) generates the electromagnetic identifying pulse or identification pulse "ID" if the armature 14 has reached the relevant end station 26 or 28. The bottommost curve is likewise designated by the same reference numeral 70 because the same additional coil 70 (or 72, 370, 372) generates the reset pulse "RP" for resetting the armature 14 from a stuck intermediate station back to the relevant end station 26 or 28. The reset pulse "RP" is generated only when the armature 14 after the generation of an electromagnetic drive pulse "DP", e.g. after a predetermined time duration, does not pass from one end station into the relevant other end station 26 or 28 and, as a result, the identification signal "ID" from the operating device 254 from FIG. 4 or 354 from FIG. 5 is also absent or not generated.

The invention claimed is:

1. An electromagnetic drive, comprising a hollow-cylindrical drive coil; an armature containing iron or consisting of iron in the form of a piston, which is arranged in an axially movable manner in the coil cavity axially with respect to the coil center axis along a rectilinear movement path; wherein axial end stops define axial end stations of the armature; characterized in that the drive coil is designed for generating a respective electromagnetic drive pulse which acts on the armature in the coil cavity and the length of which is shorter than the axial movement duration of the armature which is required by the armature with its axial iron center optionally in each case either from one end station or from the other end station until reaching the axial center of the movement path, wherein the electromagnetic force of the drive pulse is strong enough to drive the armature in each case from one end station or from the other end station through the axial center of the movement path right into the relevant other end station; wherein holders are provided in such a way that they hold the armature in the end station respectively reached in each case until the armature is driven again, by an electromagnetic drive pulse of the drive coil acting on it once again, from the end station reached through the axial center of the movement path right into the relevant other end station.

2. An electromagnetic drive according to claim 1, wherein at least in the case of one of the two end stations, preferably in the case of each of the two end stations, said holders have at least one holding magnet arranged in such a way that its holding magnet force acts on the armature in the relevant end station and thereby holds it in said end station as long as a renewed electromagnetic drive pulse from the drive coil does not act on it; wherein the drive pulse is preferably stronger than the holding magnet force and can thereby overcome the latter.

3. An electromagnetic drive according to claim 2, wherein the holding magnets have at least one permanent magnet, preferably a ring magnet, which generates the holding magnet force.

4. An electromagnetic according to claim 2, wherein the holding magnets have at least one electromagnetic holding coil for generating the holding magnet force.

5. An electromagnetic drive according to claim 1, wherein at least for one of the two, preferably for both, end stations, a respective sensor is provided for identifying whether the armature is situated in said end station.

6. An electromagnetic drive according to claim 1, wherein in the case of at least one of the two end stations, preferably in the case of each of the two end stations, in a manner axially offset with respect to the center of the movement path, a coil is provided as an identifying coil for inductively identifying whether the armature is situated in said end station.

7. An electromagnetic drive according to claim 1, wherein at least one electromagnetic coil is provided as a reset coil in such a way that it can generate an electromagnetic reset pulse which can act on the armature and thereby drive it back from a position stuck between the end stations into one of said end stations.

8. An electromagnetic drive according to claim 1, wherein in the case of at least one of the two end stations, preferably in the case of each of the two end stations, in a manner axially offset with respect to the axial center of the movement path, at least one additional coil is provided in such a way that alternatively either it can generate an electromagnetic identifying field for inductively identifying whether the armature is situated in said end station, or it can generate an electromagnetic reset pulse which can act on the armature and thereby drive it back from a position stuck between the end stations into one of said end stations.

9. An electromagnetic drive according to claim 1, wherein said electromagnetic drive is designed as an apparatus unit.

10. An electromagnetic drive installation comprising:
an electromagnetic drive according to claim 1 and
an open-loop or closed-loop control device, which is connected or can be connected to the drive coil and is designed for generating electrical pulses and outputting said electrical pulses to the drive coil in such a way that the electrical pulses generate in the drive coil the electromagnetic drive pulses.

11. An electromagnetic drive installation according to claim 10, wherein the open-loop or closed-loop control device is connected or can be connected to an identifying coil and is designed for generating and outputting an electrical voltage, preferably electrical voltage pulses, to the identifying coil in such a way that the open-loop or closed-loop control device inductively detects whether the armature is situated in the relevant end station.

12. An electromagnetic drive installation according to claim 10, wherein the open-loop or closed-loop control device is connected or can be connected to a reset coil and is designed for generating and outputting electrical reset pulses which can act on the armature and thereby drive it back from a position stuck between the end stations into one of said end stations.

13. An electromagnetic drive installation according to claim 10, wherein the open-loop or closed-loop control device is connected or can be connected to an additional coil and is designed for alternatively generating an electrical voltage for inductively identifying the armature in at least one of the two end stations or for generating electrical reset pulses, wherein said electrical reset pulses can respectively generate the electromagnetic reset pulse which can act on the armature and thereby drive it back from a position stuck between the end stations into one of said end stations.

14. Use of a drive according to claim 1 as an actuating drive (actuator) of actuating cylinders, in particular of valves, positioning cylinders, electrical switches, relays, transistors, thyristors and in particular for the actuation of throttle valves, in each case in particular for the actuation of exhaust gas throttle valves of internal combustion engines, and in each case in particular of motorcycle traction drives having an internal combustion engine.

15. An electromagnetic drive, comprising
a hollow-cylindrical drive coil;
an armature containing iron or consisting of iron in the form of a piston, which is arranged in an axially movable manner in the coil cavity axially with respect to the coil center axis along a rectilinear movement path;
axial end stops which define axial end stations of the armature;
wherein the drive coil is designed for generating a respective electromagnetic drive pulse which acts on the armature in the coil cavity and the electromagnetic force of which is strong enough to drive the armature in each case from one end station or from the other end station through the axial center of the movement path right into the relevant other end station;
a holder at each end station which are provided such that they hold the armature in the end station respectively reached in each case until the armature is driven again, by an electromagnetic drive pulse of the drive coil acting on it once again, from the end station reached through the axial center of the movement path right into the relevant other end station;

wherein in the case of at least one, preferably in the case of both end stations, in each case at least one additional coil is arranged in a manner axially offset with respect to the center of the movement path of the armature coaxially with respect to the coil center axis, and thus also coaxially with respect to the center axis of the armature, in such a way that it can interact electromagnetically with the armature in a manner axially offset from the center of the movement path.

16. An electromagnetic drive according to claim 15, wherein the permanent magnets are ring magnets which coaxially surround the coil center axis.

17. An electromagnetic drive according to claim 15, wherein in the case of at least one of the two end stations, preferably in the case of each of the two end stations, in a manner axially offset with respect to the center of the movement path, a coil is provided as an identifying coil for inductively identifying whether the armature is situated in said end station.

18. An electromagnetic drive according to claim 15, wherein at least one electromagnetic coil is provided as a reset coil in such a way that it can generate an electromagnetic reset pulse which can act on the armature and thereby drive it back from a position stuck between the end stations into one of said end stations.

19. An electromagnetic drive according to claim 15, wherein in the case of at least one of the two end stations, preferably in the case of each of the two end stations, in a manner axially offset with respect to the axial center of the movement path, at least one additional coil is provided in such a way that alternatively either it can generate an electromagnetic identifying field for inductively identifying whether the armature is situated in said end station, or it can generate an electromagnetic reset pulse which can act on the armature and thereby drive it back from a position stuck between the end stations into one of said end stations.

20. An electromagnetic drive according to claim 15, wherein an open-loop or closed-loop control device, is provided, which a) is connected or can be connected to the at least one additional coil for generating the electromagnetic interaction with the armature, and b) is connected or can be connected to the drive coil and is connected for generating electrical pulses and outputting said electrical pulses to the drive coil; and in that the electrical pulses and the drive coil are designed in such a way that they can generate the electromagnetic drive pulse in such a way that the length thereof is shorter than the axial movement duration of the armature which is required by the armature with its axial iron center optionally in each case either from one end station or from the other end station until reaching the axial center of the movement path.

21. Use of an electromagnetic drive according to claim 16 as an actuating drive (actuator) of valves, positioning cylinders, electrical switches, relays, throttle valves, in particular of throttle valves of internal combustion engines, in particular of throttle valves of internal combustion engines of motor cycles.

22. An electromagnetic drive, comprising
a hollow-cylindrical drive coil;
an armature containing iron or consisting of iron in the form of a piston, which is arranged in an axially movable manner in the coil cavity axially with respect to the coil center axis along a rectilinear movement path;
axial end stops which define axial end stations of the armature; wherein the drive coil is designed for generating a respective electromagnetic drive pulse which acts on the armature in the coil cavity and the electromagnetic force of which is strong enough to drive the armature in each case from one end station or from the other end station through the axial center of the movement path right into the relevant other end station;
holding means which are provided such that they hold the armature in the end station respectively reached in each case until the armature is driven again, by an electromagnetic drive pulse of the drive coil acting on it once again, from the end station reached through the axial center of the movement path right into the relevant other end station;
wherein the drive coil is designed in such a way that it can generate the electromagnetic drive pulse in such a way that the length thereof is shorter than the axial movement duration of the armature which is required by the armature with its axial iron center optionally in each case either from one end station or from the other end station until reaching the axial center of the movement path; and in that either a) in the case of at least one of the two end stations, preferably in the case of each of the two end stations, in a manner axially offset with respect to the center of the movement path, at least one additional coil is provided as an identifying coil for inductively identifying whether the armature is situated in said end station; and/or b) in that at least one additional coil is provided as an electromagnetic reset coil in such a way that it can generate an electromagnetic reset pulse which can act on the armature and thereby drive it back from a position stuck between the end stations into one of said end stations; or c) in that at least one additional coil is provided in such a way that alternatively either it can generate an electromagnetic identifying field for inductively identifying whether the armature is situated in said end station, or it can generate an electromagnetic reset pulse which can act on the armature and thereby drive it back from a position stuck between the end stations into one of said end stations.

23. An electromagnetic drive according to claim 22, wherein the holding means at each end station have at least one permanent magnet for holding the armature in the relevant end station.

24. An electromagnetic drive according to claim 1, wherein in the case of at least one, preferably in the case of the two end stations, a respective additional coil is arranged in a manner axially offset with respect to the center of the movement path coaxially with respect to the coil center axis, and thus also coaxially with respect to the center axis of the armature, in such a way that it can generate an electromagnetic field which permeates the armature respectively in one and in the other of the two end stations, respectively, but not or only more weakly in the center of the movement path.

* * * * *